US011460637B2

(12) United States Patent
Brusberg

(10) Patent No.: US 11,460,637 B2
(45) Date of Patent: Oct. 4, 2022

(54) OPTICAL CONNECTION SUBSTRATES FOR PASSIVE FIBER TO WAVEGUIDE COUPLING

(71) Applicant: Corning Research & Development Corporation, Corning, NY (US)

(72) Inventor: Lars Martin Otfried Brusberg, Corning, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/872,991

(22) Filed: May 12, 2020

(65) Prior Publication Data
US 2020/0363588 A1 Nov. 19, 2020

Related U.S. Application Data

(60) Provisional application No. 62/848,232, filed on May 15, 2019.

(51) Int. Cl.
*G02B 6/26* (2006.01)
*G02B 6/44* (2006.01)

(52) U.S. Cl.
CPC .............. *G02B 6/26* (2013.01); *G02B 6/4403* (2013.01)

(58) Field of Classification Search
CPC .................................. G02B 6/26; G02B 6/4403
USPC .......................................................... 385/50
See application file for complete search history.

(56) References Cited

U.S. PATENT DOCUMENTS

| 5,123,068 A | * | 6/1992 | Hakoun | G02B 6/30 |
| | | | | 385/14 |
| 5,555,333 A | * | 9/1996 | Kato | G02B 6/4214 |
| | | | | 385/83 |
| 5,671,315 A | * | 9/1997 | Tabuchi | G02B 6/4208 |
| | | | | 385/137 |
| 6,154,591 A | * | 11/2000 | Kershaw | G02F 1/0136 |
| | | | | 349/1 |
| 6,181,864 B1 | * | 1/2001 | Jang | G02B 6/3834 |
| | | | | 385/137 |
| 6,665,487 B2 | | 12/2003 | Wang | |
| 9,971,096 B2 | * | 5/2018 | Shastri | G02B 6/136 |
| 10,459,160 B2 | * | 10/2019 | Brusberg | H05K 1/0274 |
| 2002/0001435 A1 | * | 1/2002 | Steinberg | G02B 6/122 |
| | | | | 385/49 |

(Continued)

FOREIGN PATENT DOCUMENTS

CN 101762971 A 6/2010

OTHER PUBLICATIONS

Barwicz et al.; "Automated, High-Throughput Photonic Packaging" Optical Fiber Technology, vol. 44, Aug. 2018, pp. 24-35.

*Primary Examiner* — Kaveh C Kianni
(74) *Attorney, Agent, or Firm* — Michael E. Carroll, Jr.

(57) ABSTRACT

An optical connection substrate that includes a fiber cavity recessed into a first surface of the optical connection substrate, where the fiber cavity has a plurality of cavity walls and a cavity floor. The optical connection substrate also includes a plurality of fiber receiving grooves recessed into the first surface and a plurality of integrated waveguides disposed within a substrate body. The plurality of cavity walls have an interface cavity wall and the plurality of fiber receiving grooves extend from the interface cavity wall toward the plurality of integrated waveguides in alignment with the plurality of integrated waveguides.

17 Claims, 9 Drawing Sheets

(56) References Cited

U.S. PATENT DOCUMENTS

| | | | |
|---|---|---|---|
| 2002/0012885 A1* | 1/2002 | Steinberg | G02B 6/136 430/321 |
| 2002/0114590 A1* | 8/2002 | Eichenberger | G02B 6/4249 385/89 |
| 2004/0105628 A1* | 6/2004 | Morse | G02B 6/3825 385/89 |
| 2012/0301073 A1* | 11/2012 | DeMeritt | G02B 6/4284 385/14 |
| 2014/0147078 A1* | 5/2014 | Bhagavatula | G02B 6/32 385/33 |
| 2014/0193116 A1* | 7/2014 | Bylander | G02B 6/4214 385/33 |
| 2014/0193124 A1* | 7/2014 | Bylander | G02B 6/3885 385/93 |
| 2015/0117821 A1* | 4/2015 | Aoki | G02B 6/425 385/83 |
| 2015/0219863 A1* | 8/2015 | Haase | G02B 6/3885 385/60 |
| 2019/0006157 A1* | 1/2019 | O'Banion | H01L 21/67109 |
| 2019/0121036 A1* | 4/2019 | Heck | G02B 6/4206 |
| 2020/0241220 A1* | 7/2020 | Evans | G02B 6/13 |

* cited by examiner

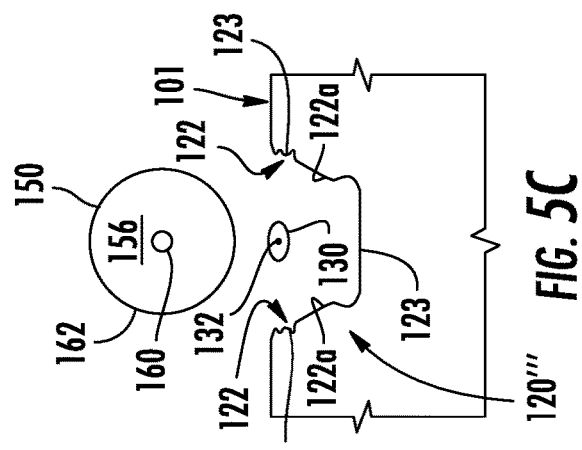
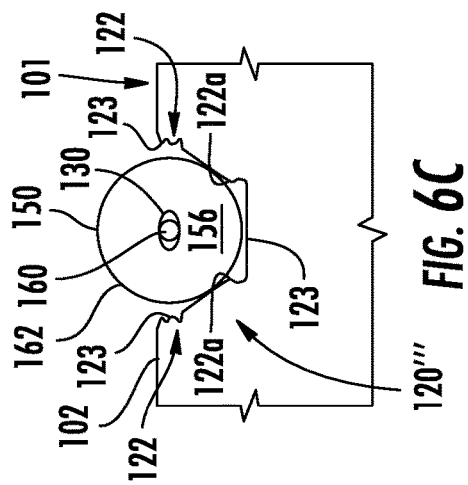
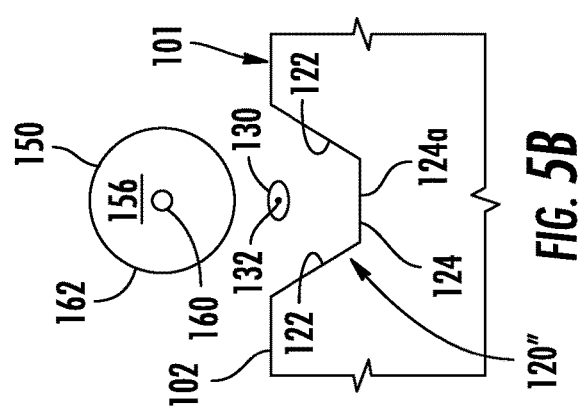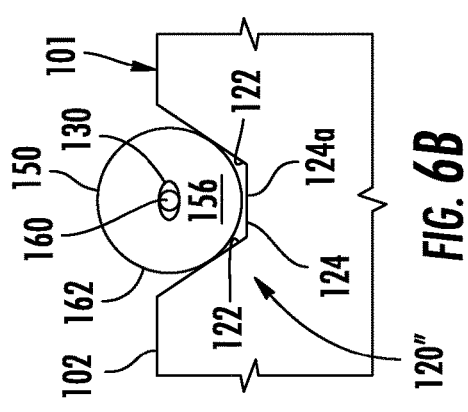
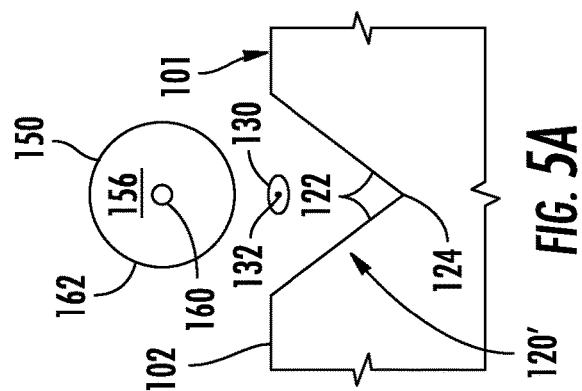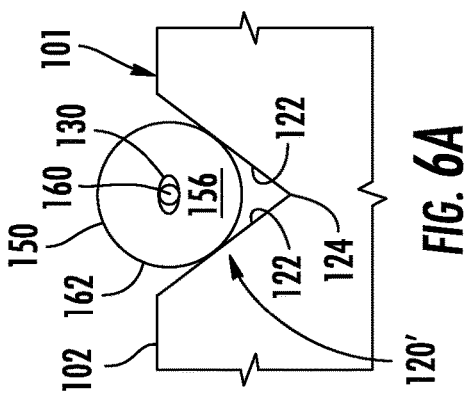

OPTICAL CONNECTION SUBSTRATES FOR PASSIVE FIBER TO WAVEGUIDE COUPLING

RELATED APPLICATIONS

This application claims the benefit of priority of U.S. Provisional Application No. 62/848,232 filed on May 15, 2019, the content of which is relied upon and incorporated herein by reference in its entirety.

BACKGROUND

Field

The present specification generally relates to substrates for optical connections. More specifically, the present disclosure relates to substrates with integrated optical waveguides and passive alignment features to facilitate optical connections between fiber arrays and integrated optical waveguides.

TECHNICAL BACKGROUND

Optical and electrical interconnects are important features of a wide variety of computing and communications devices and are key components of datacenters. Current interconnects include optical transceivers co-packaged with logic integrated circuits (ICs) and/or switch application specific integrated circuits (ASICs) on the same substrate. Co-packaging optical transceivers and integrated circuits on a substrate reduces the length of electrical interconnects to a few millimeters to achieve a signal performance of 112 GB/s and above. Reducing the length of electrical interconnects also helps to mitigate the high loss of high frequency electrical signals and help mitigate the increase in power consumption. Indeed, both power consumption and cost may be reduced by positioning transceivers close to an IC. Current interconnects include fiber array units (FAU), which are fiber assemblies that include an array of fibers end-face polished fibers aligned in a V-groove.

Current FAUs are actively aligned and permanently attached to photonic integrated circuits (PIC) using transceivers. For switch generation of 51.2 TB/s, the total number of optical fibers can be up to 1024 for single wavelength transmission. However, because substrates have limited edge space, to achieve 51.2 TB/s the pitch (e.g., spacing) between adjacent fibers must be very small (e.g., 127 µm or less), the cladding of each fiber much be very thin (e.g., about 80 µm or less), or both, to increase the fiber density of FAU. However, accurate and repeated fiber core pitch accuracy of 0.5 µm or less is more challenging to achieve for FAU's with a large number of optical fibers. While the high precision of active alignment provides low coupling loss, the costs of active alignment are high and the scalability of active alignment is limited, particularly in emerging optical assembly and electrical packaging technologies. Accordingly, improved, high precision assemblies for passive alignment between optical fibers and PICs are desired.

SUMMARY

According to one embodiment of the present disclosure, an optical connection substrate includes a fiber cavity recessed into a first surface of the optical connection substrate, where the fiber cavity has a plurality of cavity walls and a cavity floor. The optical connection substrate also includes a plurality of fiber receiving grooves recessed into the first surface and a plurality of integrated waveguides disposed within a substrate body. The plurality of cavity walls comprise an interface cavity wall and the plurality of fiber receiving grooves extend from the interface cavity wall toward the plurality of integrated waveguides in alignment with the plurality of integrated waveguides.

According to another embodiment of the present disclosure, an optical assembly includes an optical connection substrate coupled to a fiber array. The fiber array includes a plurality of optical fibers each having a core and a cladding. A portion of the fiber array is positioned in a fiber cavity recessed into a first surface of the optical connection substrate to a cavity floor. The plurality of optical fibers are disposed in a plurality of fiber receiving grooves recessed into the first surface. In addition, the plurality of fiber receiving grooves extend from an interface cavity wall of the fiber cavity toward a plurality of integrated waveguides disposed within a substrate body of the optical connection substrate such that the cores of the plurality of optical fibers are optically coupled to the plurality of integrated waveguides.

Accordingly to yet another embodiment of the present disclosure, a method of manufacturing an optical assembly having an optical connection substrate coupled to a fiber array that has a plurality of optical fibers, includes forming a plurality of integrated waveguides in a substrate body of the optical connection substrate, forming a fiber cavity recessed into a first surface of the optical connection substrate, where the fiber cavity has a cavity floor and a plurality of cavity walls that include an interface cavity wall. The method also includes forming a plurality of fiber receiving grooves recessed into the first surface of the optical connection substrate, extending from the interface cavity wall toward the plurality of integrated waveguides in alignment with the plurality of integrated waveguides, positioning a portion of the fiber array in the fiber cavity and the plurality of optical fibers in the plurality of fiber receiving grooves, such that a core of each of the plurality of optical fibers is optically coupled to an individual integrated waveguide of the plurality of integrated waveguides, and securing a portion of the fiber array to the fiber cavity and the plurality of optical fibers to the plurality of fiber receiving grooves using an adhesive.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 5A schematically depicts an example fiber receiving groove having groove walls that converge at a groove base and an example optical fiber having a core and a cladding, according to one or more embodiments shown and described herein;

FIG. 5B schematically depicts an example fiber receiving groove having groove walls and a groove base floor and an example optical fiber having a core and a cladding, according to one or more embodiments shown and described herein;

FIG. 5C schematically depicts a fiber receiving groove having groove walls with angled portions and jagged portions and an example optical fiber having a core and a cladding, according to one or more embodiments shown and described herein;

FIG. 6A schematically depicts the optical fiber of FIG. 5A disposed in the fiber receiving groove of FIG. 5A, according to one or more embodiments shown and described herein;

FIG. 6B schematically depicts the optical fiber of FIG. 5B disposed in the fiber receiving groove of FIG. 5B, according to one or more embodiments shown and described herein;

FIG. 6C schematically depicts the optical fiber of FIG. 5C disposed in the fiber receiving groove of FIG. 5C, according to one or more embodiments shown and described herein;

DETAILED DESCRIPTION

Figure 1:
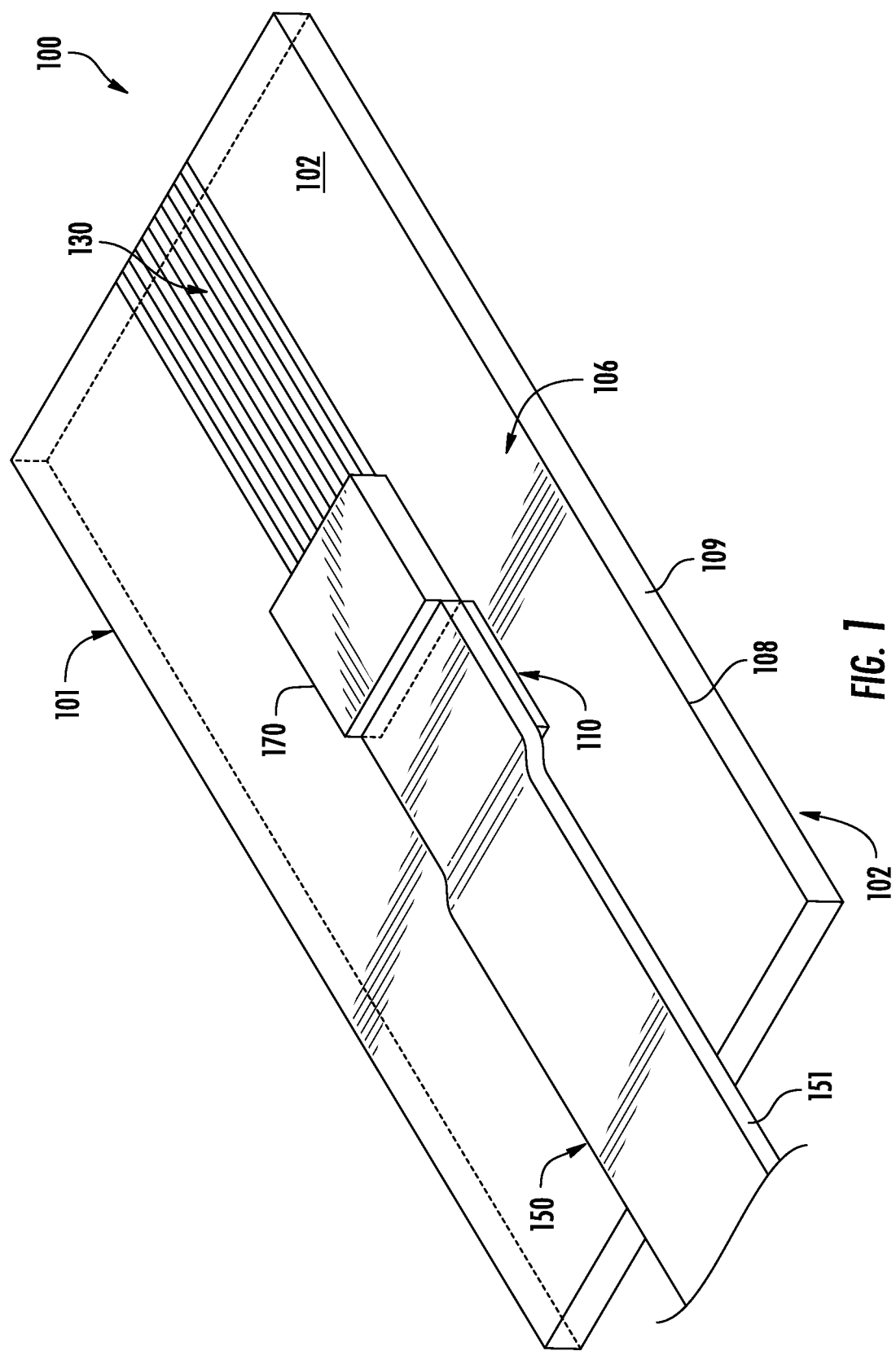
FIG. 1 depicts an optical assembly comprising a fiber array having a plurality of optical fibers coupled to an optical connection substrate, according to one or more embodiments shown and described herein.

Reference will now be made in detail to embodiments of optical assemblies that include an optical connection substrate for a passive, repeatable alignment to a fiber array, examples of which are illustrated in the accompanying drawings. The optical connection substrate is a monolithic glass substrate with a plurality of integrated waveguides. The optical connection substrate includes a fiber cavity sized for receiving a portion of a fiber array, for example, a ribbon matrix of the fiber array, and a plurality of fiber receiving grooves sized for receiving exposed (e.g., stripped) portions of a plurality of optical fibers of the fiber array. The fiber receiving grooves extend from the fiber cavity in alignment with the plurality of integrated waveguides, such that optical fibers positioned in the fiber receiving grooves are optically coupled to the plurality of integrated waveguides. The optical connection substrate provides scalable alignment features for passive alignment of optical fibers. The optical connection substrate may be used to manage the optical fibers for datacenter switches or any datacenter or high-performance computing or telecom optical connectivity components, such as optical backplanes. Whenever possible, the same reference numerals will be used throughout the drawings to refer to the same or like parts.

Referring now to FIG. 1, an optical assembly 100 is schematically depicted. The optical assembly 100 includes an optical connection substrate 101 and a fiber array 150 coupled to the optical connection substrate 101. The fiber array 150 comprises a plurality of optical fibers 152 and in some embodiments is a fiber ribbon such that the plurality of optical fibers 152 are disposed in a ribbon matrix 151. The fiber array 150 is depicted in more detail in FIGS. 2A and 2B. The optical connection substrate 101 is depicted in more detail in FIGS. 3A-4 and comprises a plurality of integrated waveguides 130, a fiber cavity 110, and a plurality of fiber receiving grooves 120. The fiber cavity 110 and the plurality of fiber receiving grooves 120 are mechanical alignment features that facilitate passive, precise alignment between the plurality of optical fibers 152 of the fiber array 150 and the plurality of integrated waveguides 130 and the optical connection substrate 101.

Figure 2A:
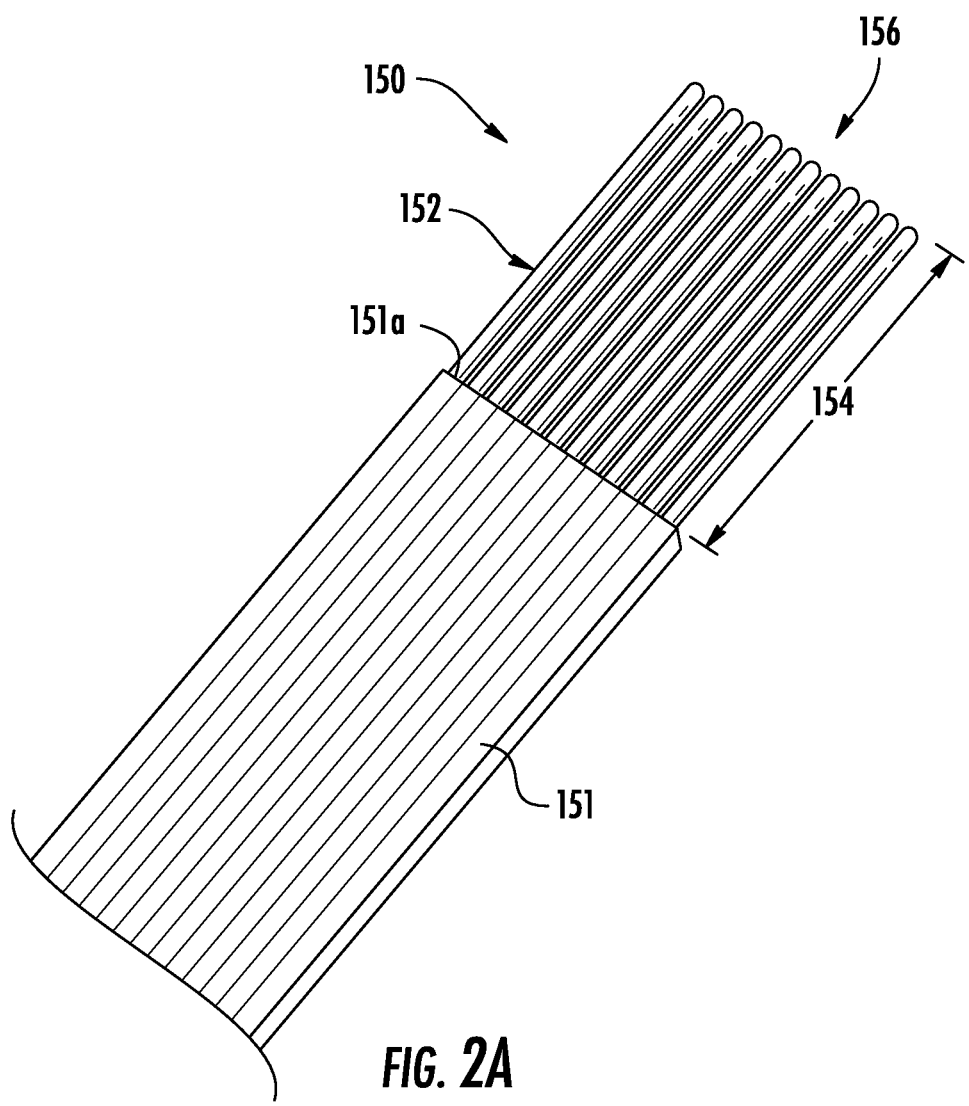
FIG. 2A depicts the fiber array of FIG. 1, according to one or more embodiments shown and described herein.
Figure 2B:
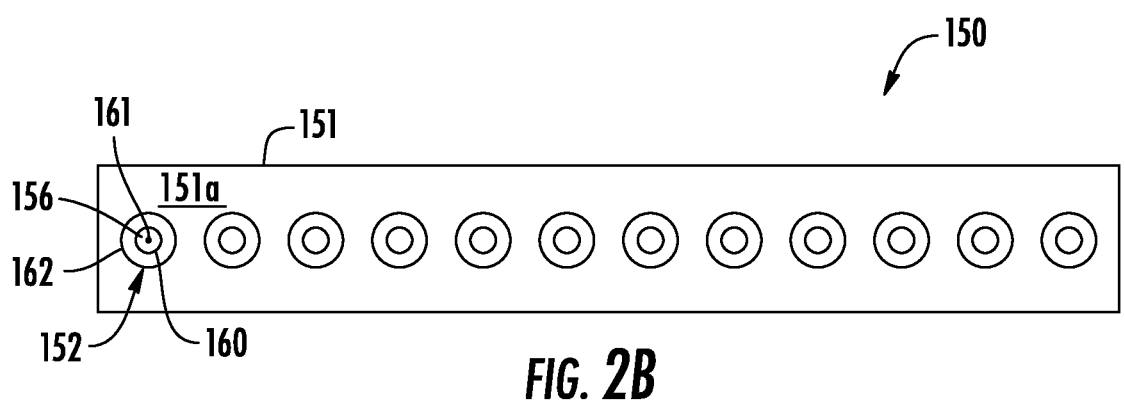
FIG. 2B depicts an end view of the fiber array of FIG. 2A, according to one or more embodiments shown and described herein.

Referring now to FIGS. 2A and 2B, the plurality of optical fibers 152 each comprise a core 160 and a cladding 162 surrounding the core 160. The core 160 and the cladding 162 each comprise a glass, plastic, or other transparent material and the core 160 comprises a higher refractive index than the cladding 162. The plurality of optical fibers 152 may comprise any known or yet to be developed optical fibers, such as single core optical fibers, multi-core optical fibers, polarization maintaining optical fibers, or the like. Further, in embodiments in which the fiber array 150 is a fiber ribbon and includes the ribbon matrix 151, the ribbon matrix 151 may comprise a polymer material, such as acrylate, epoxy, or the like. In embodiments comprising the ribbon matrix 151, the ribbon matrix 151 is stripped or otherwise removed from a portion of the plurality of optical fibers 152 such that each of the plurality of optical fibers 152 comprise an exposed fiber segment 154 that extends outward from the ribbon matrix 151. Further, the ribbon matrix 151 comprises a ribbon matrix end face 151a and the exposed fiber segment 154 of each of the plurality of optical fibers 152 extends outward from the ribbon matrix end face 151a to a fiber end face 156. In some embodiments, the fiber end face 156 is coated with an anti-reflection coating. In the embodiment depicted in FIGS. 2A and 2B, the fiber array 150 comprises 12 optical fibers 152, however, it should be understood that increased numbers of optical fibers 152 are contemplated, for example 16, 24, 64, 1024, or the like.

Figure 3A:
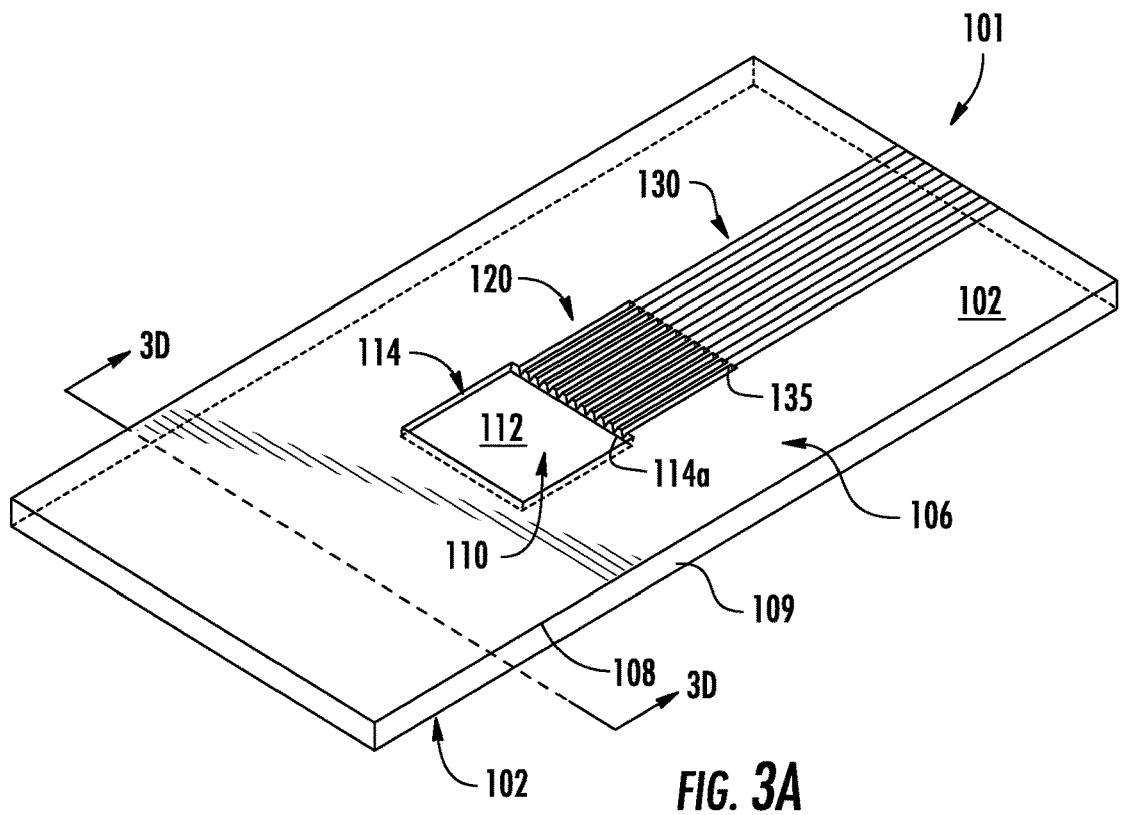
FIG. 3A depicts the optical connection substrate of FIG. 1 having a fiber cavity, a plurality of fiber receiving grooves, and a plurality of integrated waveguides, according to one or more embodiments shown and described herein.
Figure 3B:
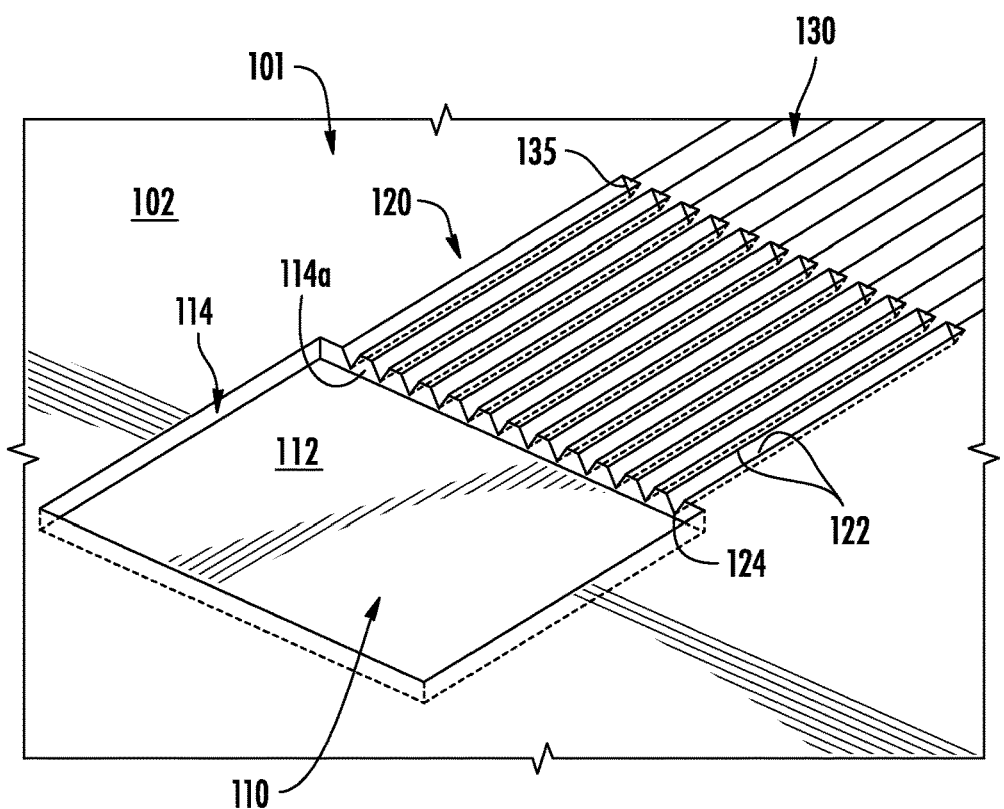
FIG. 3B depict a partial view of the fiber cavity, the plurality of fiber receiving grooves, and the plurality of integrated waveguides of the optical connection substrate of FIG. 3A, according to one or more embodiments shown and described herein.
Figure 3C:
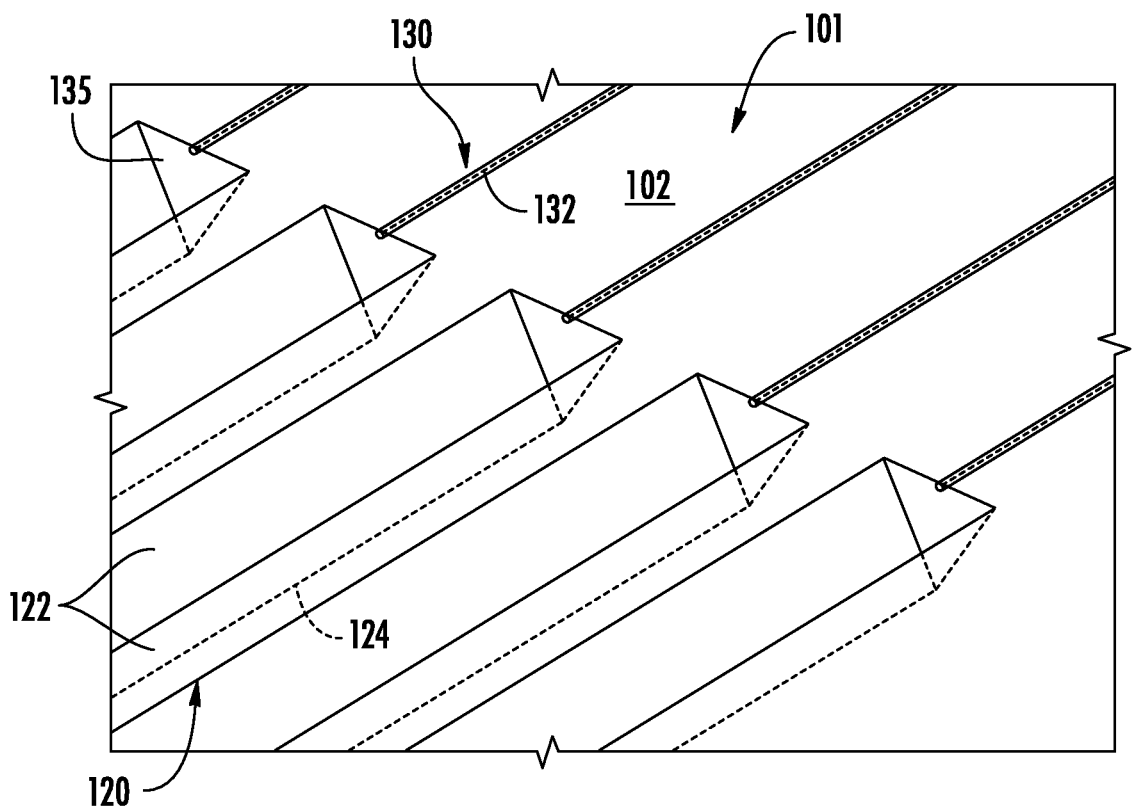
FIG. 3C depicts a partial view of an interface between the plurality of fiber receiving grooves and the plurality of integrated waveguides of FIG. 3A, according to one or more embodiments shown and described herein.
Figure 3D:
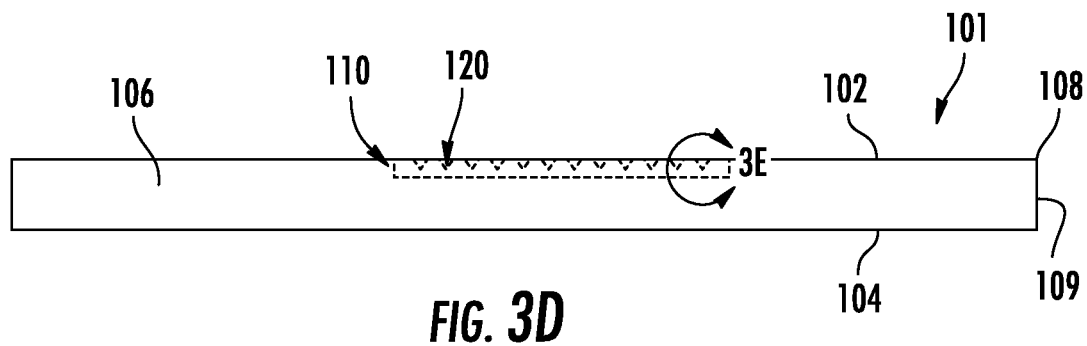
FIG. 3D depicts a cross-section of the optical connection substrate of FIG. 3A along line 3D-3D, according to one or more embodiments shown and described herein.
Figure 3E:
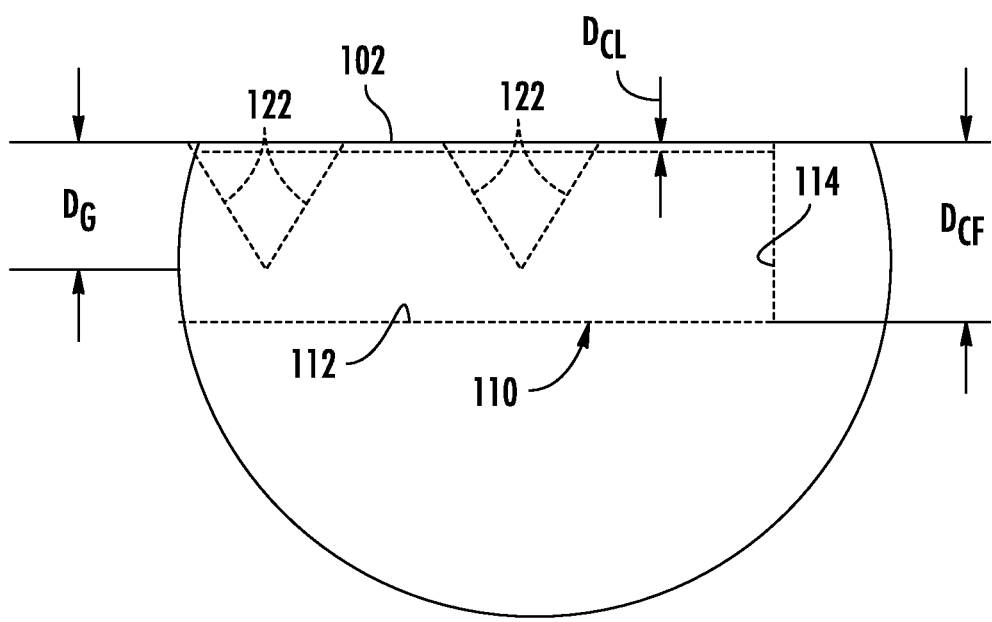
FIG. 3E depicts a partial view of the cross-section of FIG. 3D, according to one or more embodiments shown and described herein.
Figure 4:
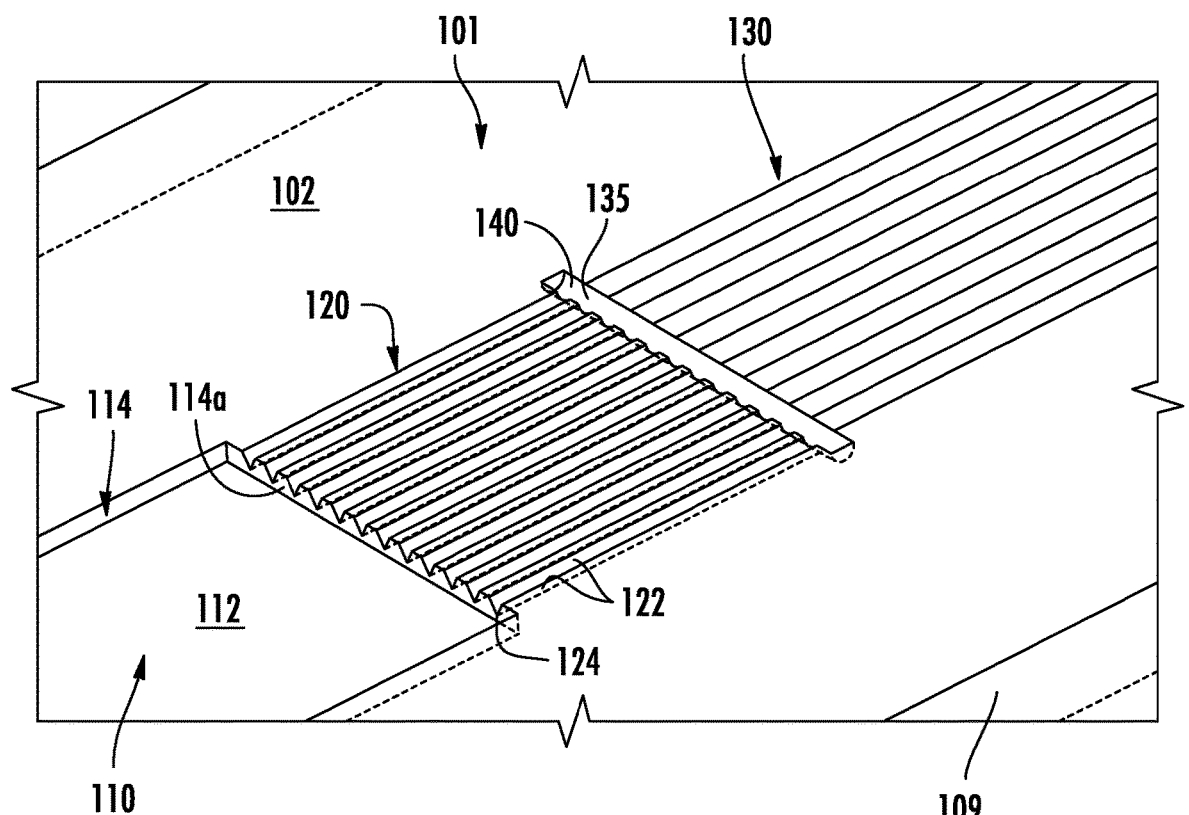
FIG. 4 depicts an optical connection substrate having a fiber cavity and a trench positioned between a plurality of fiber receiving grooves and a plurality of integrated waveguides, according to one or more embodiments shown and described herein.

Referring now to FIGS. 3A-4, the optical connection substrate 101 is a monolithic glass substrate and may comprise an ion-exchangeable glass, such as soda-lime, borosilicate, germanosilicate, aluminosilicate or non-ion-exchangeable glass such as chalcogenide glasses and fused silica. The optical connection substrate 101 comprises a first surface 102 opposite a second surface 104, a perimeter 108, and a substrate body 106 disposed between the first surface 102 and the second surface 104. One or more edge surfaces 109 extend between the first surface 102 and the second surface 104 along the perimeter 108. The plurality of integrated waveguides 130 are disposed within the substrate body 106, below the first surface 102 of the optical connection substrate 101. The plurality of integrated waveguides 130 terminate at one or more interface waveguide walls 135. In some embodiments, as depicted in FIGS. 3A-3C, each integrated waveguide 130 terminates at an individual interface waveguide wall 135 and in other embodiments, the plurality of integrated waveguides 130 terminate at a common interface waveguide wall 135 (FIG. 4). The plurality of integrated waveguides 130 may comprise ion-exchanged single-mode waveguides (e.g., silver ion-exchanged single-mode waveguides), ion-exchanged multi-mode waveguides, laser-written waveguides, deposited and/or lithographically defined waveguides, or the like.

As depicted in FIGS. 3A-4, the fiber cavity 110 and the plurality of fiber receiving grooves 120 are each recessed into the first surface 102 of the optical connection substrate 101. The fiber cavity 110 of the optical connection substrate 101 has a cavity floor 112 and a plurality of cavity walls 114, including an interface cavity wall 114a. The plurality of cavity walls 114 extend from the first surface 102 of the optical connection substrate 101 to the cavity floor 112. The plurality of fiber receiving grooves 120 are positioned between the fiber cavity 110 and the plurality of integrated waveguides 130. In particular, the plurality of fiber receiving grooves 120 interface with the interface cavity wall 114a of the fiber cavity 110 and extend from the interface cavity wall 114a toward the plurality of integrated waveguides 130, in alignment with the plurality of integrated waveguides 130. In some embodiments, the plurality of fiber receiving grooves 120 comprise a length of 1-10 mm, for example, 2-5 mm.

In some embodiments, each interface waveguide wall 135 of the plurality of integrated waveguides 130 is also an end of each fiber receiving groove 120 such that each of the plurality of fiber receiving grooves 120 extend from the interface cavity wall 114a to one of the one or more of interface waveguide walls 135. In other embodiments, as depicted in FIG. 4, a trench 140 extends into the first surface 102 between each of the plurality of the of fiber receiving grooves 120 and the one or more interface waveguide walls 135. The trench 140 may be added when the fiber receiving grooves 120 are manufactured using processes that cannot produce fiber receiving grooves 120 that dead end into the integrated waveguides 130. It should be understood that embodiments with and without the trench 140 are contemplated. In some embodiments, the one or more interface waveguide walls 135 are orthogonal to the first surface 102 and in other embodiments, the one or more interface waveguide walls 135 are angled with respect to the first surface 102, for example, angled from 80° to less than 90° with respect to the first surface 102. Angling the one or more interface waveguide walls 135 with respect to the first surface 102 may reduce back reflection of light propagating from the plurality of optical fibers 152 into the plurality of integrated waveguides 130. The fiber end-face can also be shaped (e.g., angled) to match the geometry (e.g., the angle) of the interface waveguide wall 135.

Referring now to FIGS. 5A-6C, individual fiber receiving grooves 120 are depicted in more detail. FIGS. 5A-5C show a schematic depiction of a cross section of different embodiments of fiber receiving grooves 120 spaced apart from a cross section of an example optical fiber 152 and FIGS. 6A-6C show the fiber receiving grooves 120 of FIGS. 5A-5C with the example optical fibers 152 positioned in contact with the fiber receiving grooves 120. The fiber receiving grooves 120 each comprise groove walls 122 extending from the first surface 102 of the optical connection substrate 101 to a groove base 124. In some embodiments, as depicted in FIGS. 5A and 6A, the groove walls 122 are angled and ends of the groove walls 122 converge at the groove base 124. In other embodiments, as depicted in FIGS. 5B and 6C, the groove base 124 comprises a groove base floor 124a, the groove walls 122 are angled, and ends of the groove walls 122 connect to the groove base floor 124a. In yet other embodiments, as depicted in FIGS. 5C and 6C, the fiber receiving grooves 120 comprise groove walls 122 with an angled portion 122a and one or more jagged portions 123, where the angled portion 122a of each groove wall 122 is positioned at the same depth such that an individual optical fiber 152 contacts the angled portions 122a of each groove wall 122 and does not contact the jagged portions 123. Furthermore, an angle between the groove walls 122 of each fiber receiving groove 120 (or between the angled portion 122a of the groove walls 122 in the embodiment depicted in FIG. 5C) is from 30° to 90°, for example, 40°, 50°, 60°, 70°, 80°, or the like.

As shown in FIGS. 6A-6C, when an individual optical fiber 152 is positioned in an individual fiber receiving groove 120, the individual optical fiber 152 contacts each groove wall 122 at the same depth within the fiber receiving groove 120. Moreover, when an individual optical fiber 152 is positioned in an individual fiber receiving groove 120, the individual optical fiber 152 may contact one portion of each groove wall 122 and may be spaced apart from the other portions of each groove wall 122 and spaced apart from the groove base 124. In other embodiments, when an individual optical fiber 152 is positioned in an individual fiber receiving grooves 120, the individual optical fiber 152 may contact any portion of the individual fiber receiving groove 120, such as portions of each groove wall 122 and the groove base 124. For example, in these embodiments, the plurality of fiber receiving grooves 120 may comprise U-grooves and an individual optical fiber 152 may make continuous contact with an individual fiber receiving groove 120.

Referring again to FIGS. 1-4, the plurality of fiber receiving grooves 120 extend in alignment with the plurality of integrated waveguides 130 such that when the plurality of optical fibers 152 are positioned in the fiber receiving grooves 120, the plurality of optical fibers 152 are optically coupled to the plurality of integrated waveguides 130. As used herein, "optically coupled" refers to two or more optical components arranged such that photons may be transferred therebetween. In some embodiments, the plurality of fiber receiving grooves 120 extend in axial alignment with the plurality of integrated waveguides 130 such that when the plurality of optical fibers 152 are positioned in the fiber receiving grooves 120, a centerline 161 of each core 162 of the plurality of optical fibers 152 is aligned with a centerline 132 of a corresponding integrated waveguide 130 of the plurality of integrated waveguides 130. The centerline 161 of each core 162 and the centerline 132 of each integrated waveguide 130 are positioned in each respective component, that when aligned, achieve the best mode overlay and the highest coupling efficiency. When each core 162 and each integrated waveguide 130 comprise circular cross-sections and are in axial alignment, each core 162 is concentric with an individual integrated waveguide of the plurality of integrated waveguides 130.

As depicted in FIGS. 3D and 3E, the cavity floor 112 of the fiber cavity 110 is recessed to a cavity floor depth $D_{CF}$ and the plurality of fiber receiving grooves 120 are recessed to one or more groove depths $D_G$. The centerline 132 of each of the plurality of integrated waveguides 130 is positioned in the substrate body 106 at one or more centerline depths $D_{CL}$. The cavity floor depth $D_{CF}$ is larger than both the one or more groove depths $D_G$ and the one or more centerline depths $D_{CL}$. Further, the centerline depth $D_{CL}$ is smaller than both the cavity floor depth $D_{CF}$ and at least one of the one or more groove depth $D_G$. In some embodiments, the cavity floor depth $D_{CF}$ is from 75 µm to 500 µm, such as from 100 µm to 400 µm, or 150 µm to 350 µm, for example, 95 µm, 125 µm, 170 µm, 200 µm, 250 µm, or the like, the groove depth $D_G$ is from 50 µm to 125 µm, such as 65 µm to 100 µm, for example, 60 µm, 70 µm, 80 µm, 90 µm, 100 µm, or the like, and the centerline depth $D_{CL}$ is from 1 µm to 100 µm, such as 5 µm to 50 µm, or 5 µm to 25 µm, for example, 2 µm, 4 µm, 8 µm, 10 µm, 20 µm, 40 µm, 80 µm, or the like.

The cavity floor depth $D_{CF}$, the groove depth $D_G$, and the centerline depth $D_{CL}$ may each be designed based on the dimensions of the fiber array 150. When the fiber array 150 comprising a fiber ribbon is coupled to the optical connection substrate 101, a portion of the ribbon matrix 151 including the ribbon matrix end face 151a is positioned in the fiber cavity 110. Because, the cavity floor depth $D_{CF}$ is larger than the groove depth $D_G$, the exposed fiber segment 154 of each of the plurality of optical fibers 152 may be disposed in the plurality of fiber receiving grooves 120 and optically coupled to the plurality of integrated waveguides 130 while a portion of the fiber array 150, such as a portion of the ribbon matrix 151 including the ribbon matrix end face 151a, is positioned in the fiber cavity 110.

While FIGS. 3D and 3E depict that the plurality of fiber receiving grooves 120 are recessed to a common groove depth $D_G$ and that the plurality of integrated waveguides 130 are recessed to a common centerline depth $D_{CL}$, in some embodiments, different fiber receiving grooves 120 may be recessed to different groove depths $D_G$ and different integrated waveguides 130 may be recessed to different centerline depths $D_{CL}$. For example, in some embodiments, multiple fiber arrays 150 may be stacked in the fiber cavity 110 and optically coupled to the plurality of integrated waveguides 130. In this embodiment, the plurality of optical fibers 152 of each of the multiple fiber arrays 150 have different pitches such that individual optical fibers 152 of the multiple fibers arrays 150 do not overlap in any single fiber receiving groove 120 and are each optically coupled to a single integrated waveguide 130. Further, since the multiple fiber arrays 150 are stacked in the fiber cavity 110, the fiber receiving grooves 120 aligned with the lower fiber array 150 should have a greater groove depth $D_G$ than the fiber receiving grooves 120 aligned with the higher fiber array 150. Moreover, the integrated waveguides 130 aligned with the fiber receiving grooves 120 that have a greater groove depth $D_G$ should have a correspondingly greater centerline depth $D_{CL}$ than the integrated waveguides aligned with the fiber receiving grooves 120 that have a lesser groove depth $D_G$.

Further, the one or more groove depths $D_G$ and the one or more centerline depths $D_{CL}$ are related such that the cores 162 are optically coupled with the integrated waveguides 130, for example, in axial alignment with the integrated waveguides 130. In some embodiments, when the plurality of optical fibers 152 are positioned in the plurality of fiber receiving grooves 120, the fiber end faces 156 are each in contact with the interface waveguide wall(s) 134 of the plurality of integrated waveguides 130. In other embodiments, when the plurality of optical fibers 152 are positioned in the plurality of fiber receiving grooves 120, the fiber end faces 156 are spaced apart from the interface waveguide wall(s) 134 of the plurality of integrated waveguides 130. When the plurality of optical fibers 152 are positioned in the plurality of fiber receiving grooves 120, the alignment between the plurality of optical fibers 152 and the plurality of integrated waveguides 130 facilitates low coupling loss, such as a coupling loss of 1 dB or less, for example, 0.75 dB or less, 0.5 dB or less, 0.25 dB or less, 0.1 dB or less, or the like. In addition, the optical modes of the plurality of optical fibers 152 may be matched with the optical modes of the plurality of integrated waveguides 130 at the one or more interface waveguide walls 135.

Adjacent fiber receiving grooves 120 are spaced apart by a groove spacing distance, often referred to as pitch, which is measured from the center of two adjacent fiber receiving grooves 120, for example, from the groove bases 124 of adjacent fiber receiving grooves 120. In addition, when the plurality of optical fibers 152 are disposed in the fiber receiving grooves 120, the grooves spacing distance may be the distance between the centerlines 161 of the cores 162 of adjacent optical fibers 152. The groove spacing distance may be from 50 µm to 500 µm, such as 75 µm, 100 µm, 125 µm, 127 µm, 150 µm, 17 µm 5, 200 µm, 250 µm 300 µm, 400 µm, or the like. In some embodiments, the optical connection substrate 101 comprises the same number of fiber receiving grooves 120 and integrated waveguides 130 and each fiber receiving groove 120 is in alignment with a particular integrated waveguide 130. Further, while the embodiments depicted in FIGS. 3A-3E comprise 12 fiber receiving grooves 120 and 12 integrated waveguides 130, it should be understood that decreased and increased numbers of fiber receiving grooves 120 and integrated waveguides 130 are contemplated, for example 1, 4, 8, 16, 24, 64, 1024, or the like.

Figure 8A:
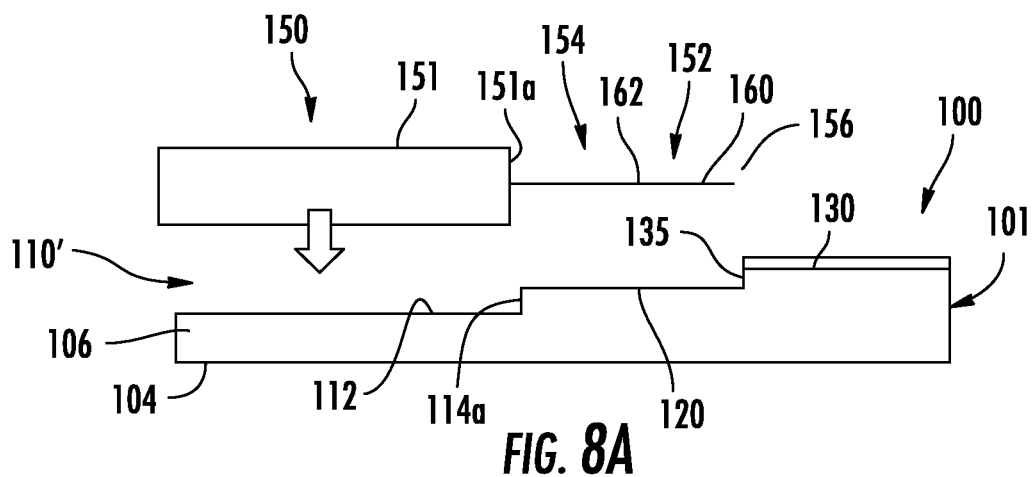
FIG. 8A depicts a side schematic view of an optical assembly with a fiber array spaced apart from an optical connection substrate that includes another embodiment of a fiber cavity, according to one or more embodiments shown and described herein.
Figure 8B:
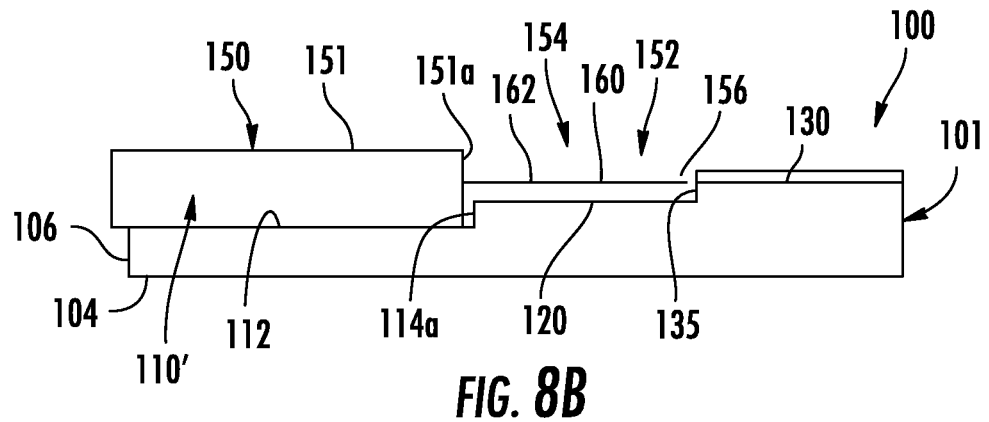
FIG. 8B depicts a side schematic view of the optical assembly of FIG. 8A with the fiber array positioned on the optical connection substrate, according to one or more embodiments shown and described herein.
Figure 8C:
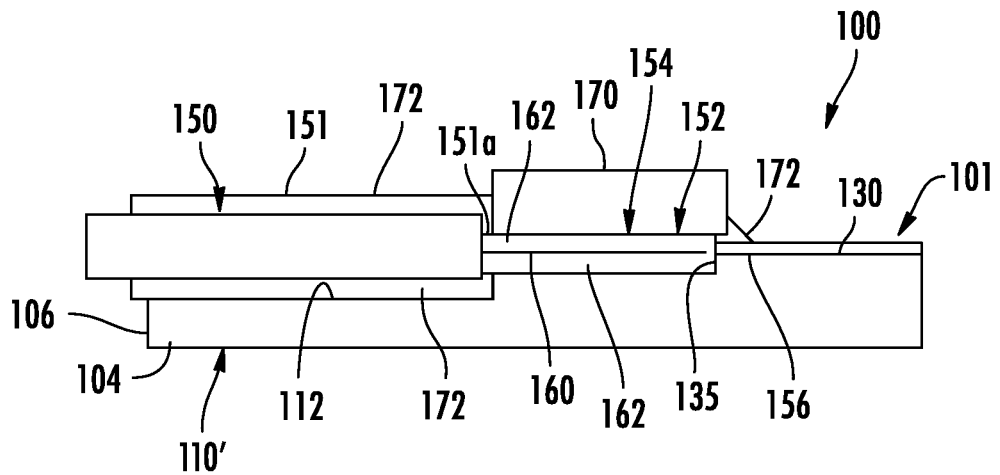
FIG. 8C depicts a side schematic view of the optical assembly of FIG. 8A with the fiber array secured to the optical connection substrate using an optical adhesive and a lid, according to one or more embodiments shown and described herein.

Referring again to FIGS. 1-4, the fiber cavity 110 may be positioned anywhere in the first surface 102 of the optical connection substrate 101, providing design flexibility. In some embodiments, the fiber cavity 110 may be positioned within the perimeter 108 of the optical connection substrate 101 and in some embodiments, the fiber cavity 110 may extend to the perimeter 108 (e.g., to the edge surfaces 109) of the optical connection substrate 101 (FIGS. 8A-8C). Many current optical connection designs require edge coupling of optical fibers to a substrate, which limits design flexibility and occupies a large footprint on the substrate. In contrast, the fiber cavity 110 may be positioned anywhere at or within the perimeter 108 of the optical connection substrate 101, which minimizes the fiber connection footprint and allows additional optical and/or electrical components, such as electrical interconnects (e.g., electrical switches and electrical lines), waveguides, through glass vias, integrated circuits, and optical interfaces (e.g., evanescent couplers) to be positioned in or on any portion of the optical connection substrate 101, facilitating the development of low profile and high density optical assemblies. Furthermore, the optical connection substrate 101 may replace fiber array units in a photonic integrated circuit assembly and is scalable to facilitate passive, precise alignment of hundreds of optical fibers and support fast switch generation, such as switch generation of up to 51.2 TB/s.

Referring now to FIGS. 7A-8C, a portion of the fiber array 150, such as the ribbon matrix 151, may be secured in the fiber cavity 110 and the exposed fiber segment 154 of each of the plurality of optical fibers 152 may be secured in the plurality of fiber receiving grooves 120 using an adhesive 172. The adhesive 172 may comprise an optical adhesive, a non-optical adhesive, or a combination thereof, such a primary optical adhesive and a secondary non-optical adhesive optimized to provide mechanical strain relief. The adhesive 172 (e.g., an optical adhesive) may be index matched with the optical connection substrate 101. The adhesive 172 may be thermally stable at temperatures of 260° C. or higher, such that the adhesive 172 does not deteriorate during a post-packaging solder reflow process. Further, the adhesive 172 (e.g., a secondary non-optical adhesive) provides strain relief by securing a portion of the fiber array 150, such as a portion of the ribbon matrix 151 in the fiber cavity 110. Example adhesives 172 include EPO-TEK® HYB-353ND-LV, NTT AT6001, and NTT GH700H. In some embodiments, a lid 170 may be used in combination with the adhesive 172 to secure the plurality of optical fibers 152 in the plurality of fiber receiving grooves 120. The lid 170 may comprise a glass material. In addition, the lid 170 may be positioned over the exposed fiber segment 154 of each of the plurality of optical fibers 152 and may be coupled to the plurality of optical fibers 152 and/or the first surface 102 of the optical connection substrate 101 using the adhesive 172. In operation, the lid 170 and may protect the exposed fiber segments 154 of each of the plurality of optical fibers 152 from contact and from environmental exposure. In some embodiments, the optical connection substrate 101 may further comprise one or more fiducials, which facilitate alignment of any features added to the optical connection substrate 101 in post processing.

Referring still to FIGS. 7A-8C, forming the optical assembly 100 first includes forming the plurality of integrated waveguides 130, the fiber cavity 110, and the fiber receiving grooves 120 in the optical connection substrate 101. In some embodiments, forming the plurality of integrated waveguides 130 comprises ion-exchanging a plurality of regions of the substrate body 106, for example, by first lithographically depositing a mask layer on locations of the first surface 102 of the optical connection substrate 101 away from the plurality of regions, thereby defining the layout of the plurality of integrated waveguides 130 and then applying an ion-exchange solution to the plurality of regions. In other embodiments, the plurality of integrated waveguides 130 may be formed by a laser writing process. Forming the fiber cavity 110 and the plurality of fiber receiving grooves 120 comprises removing material from the substrate body 106 extending into the first surface 102 of the optical connection substrate 101. Material may be removed from the substrate body 106 using a laser material removal process, a mechanical material removal process, a chemical etching process, or combinations thereof. For example, removing material from the substrate body 106 may comprise laser ablation, precision micro machining using precision tooling, photoinitiation followed by selective chemical etching, laser assisted etching, laser damaging (e.g., ablation) and chemical etching, laser processing the substrate to selectively alter the etching rate of the substrate body 106 followed by selective etching, or a combination thereof.

In some embodiments, forming the fiber cavity 110, forming the plurality of fiber receiving grooves 120, or both, may occur prior to ion-exchanging the plurality of regions of the substrate body 106 to form the plurality of integrated waveguides 130. In other embodiments, ion exchanging the plurality of regions of the substrate body 106 to form the plurality of integrated waveguides 130 occurs prior to forming the fiber cavity 110 and the plurality of fiber receiving grooves 120. When one or both of the fiber cavity 110 and the plurality of fiber receiving grooves 120 are formed using chemical etching after the formation of the plurality of integrated waveguides 130, the plurality of integrated waveguides 130 are masked with a protective mask layer, such as ink, photoresist, chrome, or the like, during the chemical etching process.

Figure 7A:
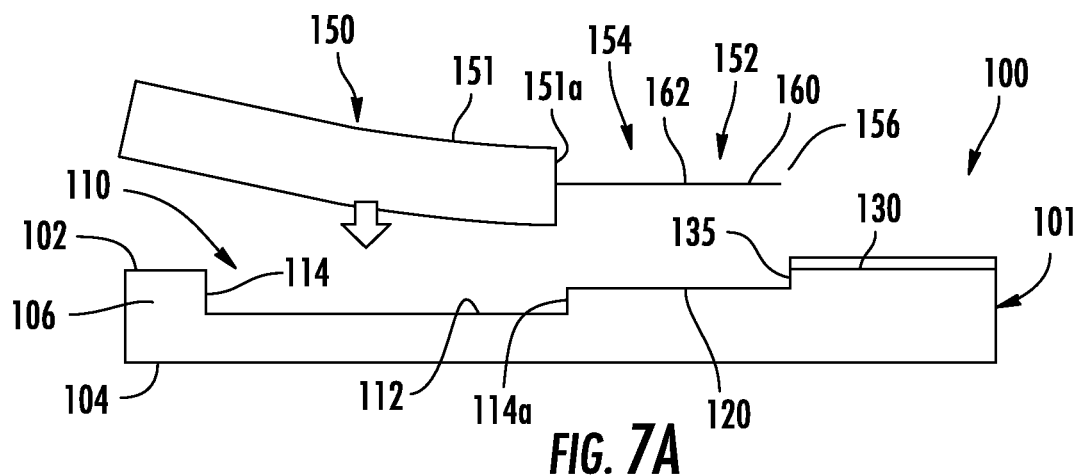
FIG. 7A depicts a side schematic view of an optical assembly with a fiber array spaced apart from an optical connection substrate that includes one embodiment of a fiber cavity, according to one or more embodiments shown and described herein.
Figure 7B:
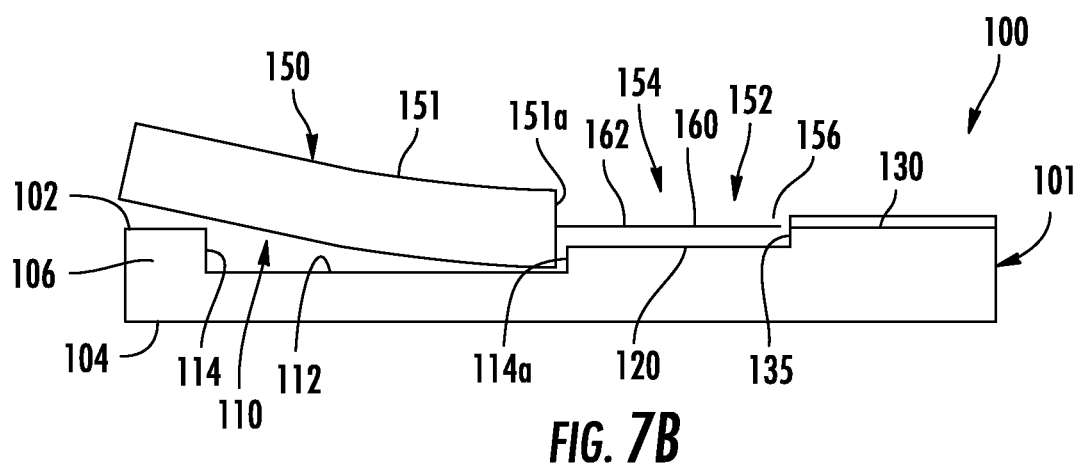
FIG. 7B depicts a side schematic view of the optical assembly of FIG. 7A with the fiber array positioned on the optical connection substrate, according to one or more embodiments shown and described herein.

Next, in embodiments in which the fiber array 150 is a fiber ribbon, the method comprises removing a portion of the ribbon matrix 151 of the fiber array 150 to expose the plurality of optical fibers 152 (e.g., forming the exposed fiber segments 154 of each of the plurality of optical fibers 152). Referring now to FIGS. 7B and 8B, once the fiber array 150 includes the exposed fiber segments 154, the method further includes positioning a portion of the fiber array 150, such as a portion of the ribbon matrix 151 that includes the ribbon matrix end face 151a, in the fiber cavity 110 and positioning the exposed fiber segments 154 of the plurality of optical fibers 152 in the plurality of fiber receiving grooves 120, such that the core 162 of each of the plurality of optical fibers 152 is optically coupled to an individual integrated waveguides 130 of the plurality of integrated waveguides 130 and in some embodiments, axially aligned with an individual integrated waveguides 130 of the plurality of integrated waveguides 130.

Figure 7C:
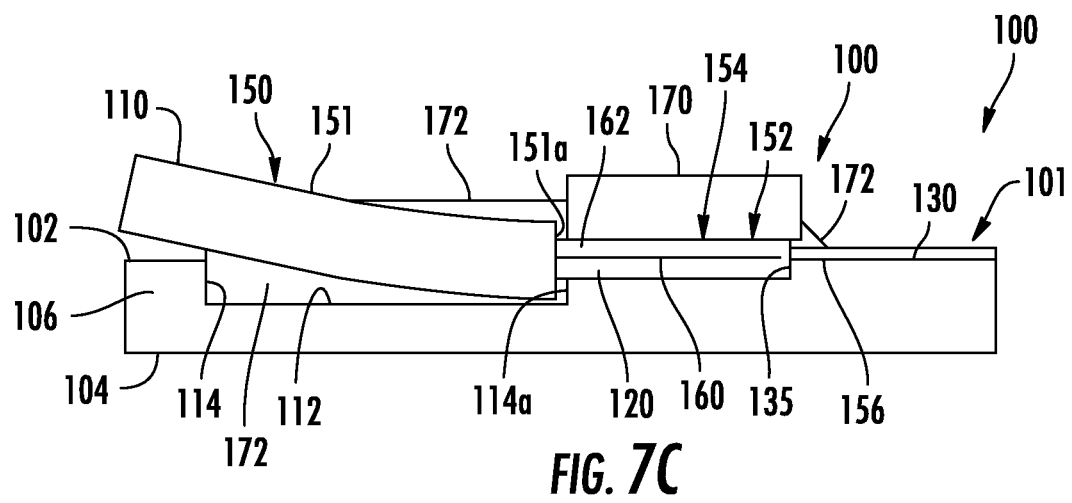
FIG. 7C depicts a side schematic view of the optical assembly of FIG. 7A with the fiber array secured to the optical connection substrate using an optical adhesive and a lid, according to one or more embodiments shown and described herein.

Referring now to FIGS. 7C and 8C, once a portion of the fiber array 150, such as a portion of the ribbon matrix 151 (e.g., the portion of the ribbon matrix 151 including the ribbon matrix end face 151a), is positioned in the fiber cavity 110 and the exposed fiber segments 154 of the plurality of optical fibers 152 are positioned in the plurality of fiber receiving grooves 120, the method further comprises securing a portion of the fiber array 150 (e.g., a portion of the ribbon matrix 151) in the fiber cavity 110 and securing the exposed fiber segments 154 of the plurality of the optical fibers 152 in the plurality of fiber receiving grooves 120. For example, the portion of the fiber array 150 (e.g., a portion of the ribbon matrix 151) may be secured in the fiber cavity 110 and the exposed fiber segments 154 may be secured in the fiber receiving grooves 120 using the adhesive 172. In addition, the method may also comprise positioning a lid 170 over the exposed fiber segments 154 of the plurality of optical fibers 152. For example, the lid 170 may be used when positioning the exposed fiber segments 154 in the plurality of fiber receiving grooves 120. Pressure applied by the lid 170 may place each exposed fiber segment 154 in contact with a respective fiber receiving grooves 120, thereby ensuring that the cores 162 of the plurality of optical fibers 152 are optically coupled with corresponding integrated waveguides 130. In addition, the lid 170 may be secured to the plurality of exposed fiber segments 154, the first surface 102 of the optical connection substrate 101, or both, using the adhesive 172.

In view of the foregoing description, it should be understood that optical assemblies may include an optical connection substrate for a passive, repeatable alignment to a fiber array. The optical connection substrate includes a fiber cavity sized for receiving a portion of the fiber array, such as a ribbon matrix, and a plurality of fiber receiving grooves that extend from the fiber cavity in alignment with the plurality of integrated waveguides, such that optical fibers positioned in the fiber receiving grooves are optically coupled to the plurality of integrated waveguides.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An optical assembly comprising an optical connection substrate coupled to a fiber array, wherein: the fiber array comprises a plurality of optical fibers each comprising a core and a cladding; a portion of the fiber array is positioned in a fiber cavity recessed into a first surface of the optical connection substrate to a cavity floor; the plurality of optical fibers are disposed in a plurality of fiber receiving grooves recessed into the first surface; and the plurality of fiber receiving grooves extend from an interface cavity wall of the fiber cavity toward a plurality of integrated waveguides disposed within a substrate body of the optical connection substrate and below the first surface such that the cores of the plurality of optical fibers are optically coupled to the plurality of integrated waveguides; the plurality of integrated waveguides terminate at one or more interface waveguide walls; each of the plurality of optical fibers terminates at a fiber end face; the fiber end faces are each in contact with, or spaced apart from, the one or more interface waveguide walls; and wherein the optical connection substrate further comprises a trench is positioned between each of the plurality of fiber receiving grooves and the one or more interface waveguide walls.

2. The optical assembly of claim 1, wherein:
the fiber array comprises a fiber ribbon having a ribbon matrix and the plurality of optical fibers are disposed within the ribbon matrix;
an exposed fiber segment of each of the plurality of optical fibers extends outward from the ribbon matrix; and
the portion of the fiber array positioned in the fiber cavity is the ribbon matrix and the exposed fiber segment of the plurality of optical fibers are each disposed in the plurality of fiber receiving grooves recessed into the first surface.

3. The optical assembly of claim 1, wherein the cores of the plurality of optical fibers are in axial alignment with the plurality of integrated waveguides.

4. The optical assembly of claim 1, wherein each of the plurality of fiber receiving grooves extend from the interface cavity wall to one of the one or more interface waveguide walls.

5. The optical assembly of claim 1, wherein:
the cavity floor of the fiber cavity is recessed to a cavity floor depth;
the plurality of fiber receiving grooves are recessed to one or more groove depths;
the plurality of integrated waveguides each comprise a centerline and are each disposed in the substrate body to one or more centerline depths;
the cavity floor depth is greater than each of the one or more groove depths; and the one or more centerline depths are each less than both the cavity floor depth and at least one of the one or more groove depths.

6. The optical assembly of claim 1, further comprising a lid positioned over a portion of the plurality of optical fibers.

7. An optical assembly comprising an optical connection substrate coupled to a fiber array, wherein:
the fiber array comprises a plurality of optical fibers each comprising a core and a cladding;
a portion of the fiber array is positioned in a fiber cavity recessed into a first surface of the optical connection substrate to a cavity floor;
the plurality of optical fibers are disposed in a plurality of fiber receiving grooves recessed into the first surface; and
the plurality of fiber receiving grooves extend from an interface cavity wall of the fiber cavity toward a plurality of integrated waveguides disposed within a substrate body of the optical connection substrate such that the cores of the plurality of optical fibers are optically coupled to the plurality of integrated waveguides;
the plurality of integrated waveguides terminate at one or more interface waveguide walls;
each of the plurality of optical fibers terminates at a fiber end face;
the fiber end faces are each in contact with the one or more interface waveguide walls; and
a trench is positioned between each of the plurality of fiber receiving grooves and the one or more interface waveguide walls.

8. The optical assembly of claim 7, wherein:
the fiber array comprises a fiber ribbon having a ribbon matrix and the plurality of optical fibers are disposed within the ribbon matrix;
an exposed fiber segment of each of the plurality of optical fibers extends outward from the ribbon matrix; and
the portion of the fiber array positioned in the fiber cavity is the ribbon matrix and the exposed fiber segment of the plurality of optical fibers are each disposed in the plurality of fiber receiving grooves recessed into the first surface.

9. The optical assembly of claim 7, wherein the cores of the plurality of optical fibers are in axial alignment with the plurality of integrated waveguides.

10. The optical assembly of claim 7, wherein each of the plurality of fiber receiving grooves extend from the interface cavity wall to one of the one or more interface waveguide walls.

11. The optical assembly of claim 7, wherein:
the cavity floor of the fiber cavity is recessed to a cavity floor depth;
the plurality of fiber receiving grooves are recessed to one or more groove depths;
the plurality of integrated waveguides each comprise a centerline and are each disposed in the substrate body to one or more centerline depths;
the cavity floor depth is greater than each of the one or more groove depths; and
the one or more centerline depths are each less than both the cavity floor depth and at least one of the one or more groove depths.

12. The optical assembly of claim 7, further comprising a lid positioned over a portion of the plurality of optical fibers.

13. An optical assembly comprising an optical connection substrate coupled to a fiber array, wherein:
the fiber array comprises a plurality of optical fibers each comprising a core and a cladding;
a portion of the fiber array is positioned in a fiber cavity recessed into a first surface of the optical connection substrate to a cavity floor;
the plurality of optical fibers are disposed in a plurality of fiber receiving grooves recessed into the first surface;
the plurality of fiber receiving grooves extend from an interface cavity wall of the fiber cavity toward a plurality of integrated waveguides disposed within a substrate body_of the optical connection substrate such that the cores of the plurality of optical fibers are optically coupled to the plurality of integrated waveguides;
the cavity floor of the fiber cavity is recessed to a cavity floor depth;
the plurality of fiber receiving grooves are recessed to one or more groove depths;
the plurality of integrated waveguides each comprise a centerline and are each disposed in the substrate body to one or more centerline depths;
the cavity floor depth is greater than each of the one or more groove depths; and
the one or more centerline depths are each less than both the cavity floor depth and at least one of the one or more groove depths.

14. The optical assembly of claim 13, wherein:
the fiber array comprises a fiber ribbon having a ribbon matrix and the plurality of optical fibers are disposed within the ribbon matrix;
an exposed fiber segment of each of the plurality of optical fibers extends outward from the ribbon matrix; and
the portion of the fiber array positioned in the fiber cavity is the ribbon matrix and the exposed fiber segment of the plurality of optical fibers are each disposed in the plurality of fiber receiving grooves recessed into the first surface.

15. The optical assembly of claim 13, wherein the cores of the plurality of optical fibers are in axial alignment with the plurality of integrated waveguides.

16. The optical assembly of claim 13, wherein each of the plurality of fiber receiving grooves extend from the interface cavity wall to one of the one or more interface waveguide walls.

17. The optical assembly of claim 13, further comprising a lid positioned over a portion of the plurality of optical fibers.

* * * * *

UNITED STATES PATENT AND TRADEMARK OFFICE
CERTIFICATE OF CORRECTION

| | |
|---|---|
| PATENT NO. | : 11,460,637 B2 |
| APPLICATION NO. | : 16/872991 |
| DATED | : October 4, 2022 |
| INVENTOR(S) | : Lars Martin Otfried Brusberg |

It is certified that error appears in the above-identified patent and that said Letters Patent is hereby corrected as shown below:

In the Claims

In Column 14, Line 20, in Claim 13, delete "body_of" and insert -- body of --.

Signed and Sealed this
Seventh Day of February, 2023

Katherine Kelly Vidal
*Director of the United States Patent and Trademark Office*